Feb. 5, 1935.  C. ZAPFFE  1,990,214
METHOD FOR REMOVING IRON AND MANGANESE FROM WATER
Original Filed March 5, 1931
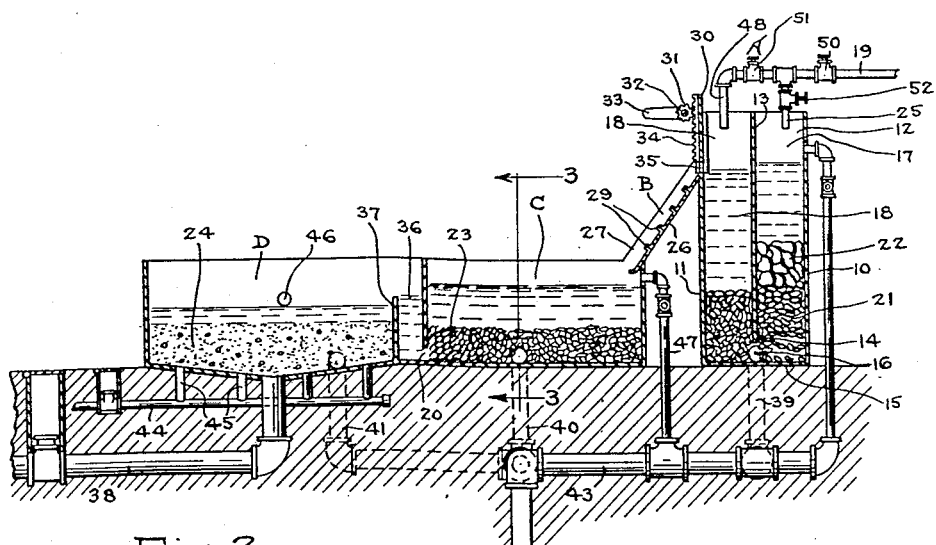
Fig-2.
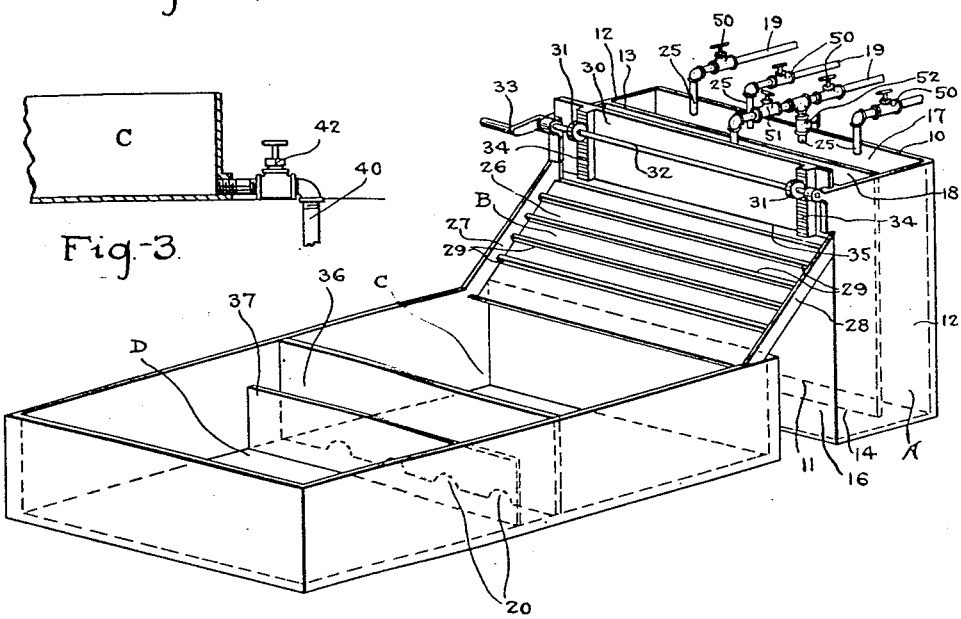
Fig-3.
Fig-1
Inventor:
Carl Zapffe.
By Whiteley and Ruckman
Attorneys.

Patented Feb. 5, 1935

1,990,214

UNITED STATES PATENT OFFICE 1,990,214

METHOD FOR REMOVING IRON AND MANGANESE FROM WATER

Carl Zapffe, Brainerd, Minn.

Application March 5, 1931, Serial No. 520,256
Renewed July 23, 1934

9 Claims. (Cl. 210—16)

My invention relates to method for removing iron and manganese from water, and has for its object to treat water supplies containing manganese while moving from source to distribution system to remove therefrom a desired amount of dissolved manganese carried by the water.

It has long been known that in the pipes and meters of certain water supply systems, particularly where the water is drawn from deep wells, slimy mud-like deposits are formed which develop into hard incrustations inside of the pipes and meters. These deposits occur everywhere, but in larger pipes, where there is more or less constant flow, and where flushing may be made effective, such deposits, whether hard or soft, do not work as much harm as they do where occurring in the small branch pipes (frequently not more than three-fourths of an inch in diameter) where the water remains stationary much of the time and there is little or no true flushing effect. It thus happens that such pipes have their flow areas seriously diminished and, finally, may be completely clogged. From this cause the fire hazard is increased due to loss of volume and pressure; also a great deal of inconvenience and damage results to owners as well as large supplemental expense to operators in maintaining the system in operative condition.

These slimy mud-like deposits have often been mistaken for true mud deposits, that is, deposits of solid substances consisting of clay, silica and the like, which are carried in suspension in the water. Investigation has shown, however, that these deposits are, in fact, oxides of iron and/or of manganese which were held in solution and have been precipitated by chemical reaction in the water in the pipes; such precipitation is also generally caused by otherwise harmless so-called iron and manganese bacteria in the water, and by other causes.

A small per cent of iron and of manganese in water for human use is not objectionable, and, indeed, is generally regarded as beneficial for human consumption. If there is present in solution in the water supply a very great excess over a minute permissible maximum, three-tenths (0.30) parts per million, the above-mentioned precipitation in the pipes and meters will occur, with its attendant difficulties, inconveniences and increases in cost of maintenance.

It is the purpose of my invention to eliminate excess iron and manganese,—particularly manganese, held in solution in public water supplies by means which are simple, relatively inexpensive, efficient and certain in operation.

After considering all known efforts at securing these ends, at least as far as shown by the literature on the subject, and after extensive and long continued experimentation, I have discovered that iron and manganese may be so simply, economically and efficiently removed by flowing the water to be treated successively through a suitable catalyzing chamber, i. e., a chamber containing a bed of some suitable catalyzing agent having a desired amount of the same and being of requisite fineness, then flowing the water in a relatively thin, agitated sheet to bring a large surface of the water in contact with the air for taking up oxygen, then passing the water through a bed of coke of a requisite degree of fineness and finally passing the water through a sand and gravel filter bed, the result of this process being to reduce the manganese and iron content of the water to a point where obnoxious precipitation and deposit in the system will not take place.

The full objects and advantages of my invention will appear in connection with the detailed description thereof and its novel features are particularly pointed out in the claims.

In the drawing, illustrating a form of apparatus for practicing my process,—

Fig. 1 is a perspective view of such apparatus diagrammatically shown. Fig. 2 is a transverse section of such diagrammatically shown apparatus. Fig. 3 is a sectional detail on line 3—3 of Fig. 2.

Referring to the drawing which illustrates a form of apparatus for carrying out the invention of my process, A designates the catalyzing chamber, B the oxidizing flow plane, C the deposition coke-box, and D the sand gravel filter. In practice the catalyzing chamber A will comprise an exterior casing formed of a rear wall 10, a front wall 11, end walls 12 and a central partition wall 13, which terminates in a lower edge 14 spaced from the bottom wall 15 so as to leave a flow passage 16 beneath the partition wall 13. All of these walls are watertight. The back wall 10 and partition wall 13 are preferably of the same height, and higher than the front wall 11. There is thus formed a back chamber 17 and a front chamber 18. This casing and the chambers formed by it may be of any size desirable to treat the requisite amount of water which must pass through them, but in practice will be relatively long and narrow, as shown. Rear chamber 17 is a receiving chamber into which any desired number of water pipes 19 discharge the water to be treated from a reservoir or other supply source of the water system. The partition 13 instead of providing a uniform passageway 16 under its bottom, may, as indicated in dotted lines in Figs. 1 and 2 have openings 20 of arch-like characteristic which have separated openings or passageways to permit the water to pass from the bottom of chamber 17 to the bottom of chamber 18, the form or size of these openings being immaterial excepting that they must be of sufficient size to permit the maximum desired flow of water, and must, of course, be so constructed that the partition 13 will not thereby be weakened, and that the entire structure will be durable and permanent in character.

In the catalyzing chamber A at the bottom of the two portions 17 and 18 therein there is deposited a sufficient amount of catalyzer which may be some form of manganese ore as pyrolusite or some manganese carrying substance. The catalyzer material is made as fine as is practical, as indicated at 21, but in the chamber 17, there will be a certain amount of the catalyzer material of large size, as indicated at 22, to prevent displacement when receiving the flow of the water upon it. Within the deposition coke box C is provided a layer of coke 23 which covers the bottom of the box. This coke also will preferably be quite fine, as better results are obtained when fine coke is employed. In the filter box D suitable layers 24 of sand and gravel are provided, forming a sand gravel filter of common construction.

The flow pipes 19 are provided with downwardly-turned sections 25 which discharge the water to be treated directly into the upper part of the rear chamber 17 of the catalyzing chamber A. From that point the water will flow downward through chamber 17 and catalyzer beds 22 and 21 upward through chamber 18, through catalyzer bed 21 therein to the lip of the oxidizing flow plane B. This is an ordinary chute having a floor 26 running down at a quite sharp angle, side walls 27 and 28 and transverse cleats 29. A gate 30 is adapted to be raised by means of pinions 31 on a shaft 32 rotated by a crank 33, said pinions engaging with racks 34 on the gate 30. By this means the front chamber 18 may be opened a suitable amount, as at 35, to permit an even flow of water over the lip of the chamber and down the flow plane B. Since this drops at a sharp angle, the water will flow in a thin sheet rapidly, and by riffle bars 29 will be caused to ripple and regurgitate, thereby being exposed to a large amount of air to take up oxygen. From the oxidizing flow plane the water goes into the coke boxes C and here the manganese oxide will deposit upon the surfaces of the coke, which I have discovered have the property of effecting such deposition.

From the coke boxes the water passes through the openings 20 into a chamber 36, between the coke box C and the filter box D, from which it flows over a lowered partition 37 into the filter box D, discharging to the supply pipe 38 in a usual way.

The arrangement of chambers and for controlling water flow herein described is, of course, diagrammatic and represents chambers or basins of any desired size practicable for carrying out the operations. It is essential that these chambers shall be capable of being drained, for which reason I provide pipes 39, 40 and 41 for withdrawing the water from the several chambers, said pipes being normally closed by valves 42, as indicated in Fig. 3, and discharged to sewer pipe 43.

It will be desirable from time to time to wash or flush the various chambers to remove surplus material carried by the filter bed D, the deposition bed C and the catalytic bed A. The filter bed may be flushed by a pressure pipe system indicted at 44 with a number of branches 45 entering the bottom of the filter bed D, wasting at the level indicated by 46, or, if desirable, being carried back through the coke bed C and wasting therefrom through the pipe 47. The catalyzer chambers will be flushed by closing the gate 30 and discharging water through pipe extension 48 into chamber 18, from which it passes under the bottom of partition wall 13 and then up through the catalyzers 21 and 22 in chamber 17 and wasting through pipe 49.

Valves 50, 51 and 52 are provided to permit the shifting of water flow into the front portion 18 of catalyzer chamber A.

It will be understood that the above defined elements of apparatus applicable to the practice of my process may be varied as circumstances and conditions require, it only being necessary to provide a requisite area of the various substances and continuous flow of water in sufficient quantities to produce demanganization of the amount of water required by the system.

In general I may say that the apparatus should be such as to provide a contact period of substantially ten minutes at each part of the purifying system. Removal may be less rapid in a new plant, but after a plant has been in operation for a short time sufficiently complete removal will be obtained in the time required for a given quantity of water to pass through the apparatus.

The features of the process as practiced are that the catalyzer bed in A preferably consists of finely divided pyrolusite, a mineral substance which is largely dioxide of manganese ($MnO_2$), or of other compounds including the dioxide of manganese or having in association therewith some suitable precipitated dioxide or/and hydroxide of manganese; and that while the water contacts with the substance as it passes through the beds thereof it is affected, probably by catalysis, so that the dissolved compounds of manganese in the water are converted first to manganous hydroxide, $Mn(OH)_2$. This also is a soluble compound, but it has the quality of rapidly combining with oxygen, that is, it oxidizes readily, thereby becoming some form of manganese oxide or hydroxide which, being insoluble, will precipitate out of the water.

The next step of the process is to supply the oxygen to the soluble manganous hydroxide. This is accomplished partly by the water splashing into chamber 17 but is definitely facilitated on the oxidizing flow plane B where the water will be greatly agitated while exposed to the air, with the result that oxygen from the air will be taken into the water, where it will combine with or oxidize the contained manganous hydroxides to higher hydroxides and oxides, such, for example, as $Mn(OH)_4$ or $MnO_2$. These are stable forms but which under certain conditions are, or become, soluble. To prevent solubility requires that the water be slightly alkaline. The degree of alkalinity needed is partly effected by the pyrolusite or catalytic bed, and is brought up to a sufficient degree by the coke in the coke deposit bed. Or, if desired, lime or other alkaline substances may be used to insure a requisite alkalinity.

The water from the oxidizing flow plane B, oxygenated and carrying with it much occluded air, is discharged into the coke bed, which acts both as an aerator and oxidizer, effecting further fixation of the manganese in the form of higher oxides, and which also acts as a collector of the hydrous oxides and oxides of manganese and iron which have been formed. The contact of the water in the coke bed therefore effects quite complete precipitation of manganese in the form of oxides and hydroxides (and also to a considerable extent of iron). Most of this precipitate is collected upon the surfaces of the particles of the cellular coke, and, as this takes place, the basic and inert coke itself, so coated, becomes a supporter of catalytic agents and takes on the catalytic character of the pyrolusite bed and continues and advances the exchange of manganese and iron from the soluble to the insoluble forms.

From the deposition coke box the water flows into and through the sand and gravel bed of the filter box. A considerable amount of the insoluble oxides of manganese and iron will flow with the water into the filter box and there be collected, and the sands and gravels coated therewith also become catalytic agents, whereupon reduction of manganese or iron contained in the water supply will become complete, or at least sufficiently so that no precipitation will take place in the mains, pipes and meters.

The advantages of my process will be quite apparent. The material involved is inexpensive and the entire plant of reasonable cost to build and extremely economical in its operation. It requires no skilled help or technicians, and it is self-regulatory as to variation of content of iron and manganese in solution in the water treated. By the use of this process enormous costs in the operation of the water supply system are avoided. Also, great inconvenience and difficulty to consumers is obviated. Finally the water supply is freed of a mineral content which often has certain injurious effects in use, such, for example, as staining plumbing fixtures, cooking utensils and fabrics in the laundry, and the production of foul odors and bad taste of the water.

The commercial value and economical durability of my process is further enhanced by the fact that the system never requires regeneration. There may at times be necessary a back washing or flushing to remove excess accumulations of non-adherent material. But further than that the system once installed is continuously effective without involving replenishment expense.

I claim:

1. A process of treating water for supply systems which consists in changing the soluble salts of manganese therein to manganese hydroxides, producing alkalinity in the water, thereafter causing the water to flow in a manner to expose a large surface thereof to air for oxygenating it, and collecting and filtering out the oxides.

2. A process of treating water for supply systems which consists in subjecting the water to catalysis to change the soluble salts of manganese therein to manganese hydroxides, producing alkalinity in the water, thereafter causing the water to flow in a manner to expose a large surface thereof to air for oxygenating it, and collecting and filtering out the hydroxides and oxides.

3. A process of treating water for supply systems which consists in contacting the water with finely divided catalyzer material to change the soluble salts of manganese therein to manganese hydroxides and oxides, producing alkalinity in the water, thereafter causing the water to flow in a manner to expose a large surface thereof to air for oxygenating it, and collecting and filtering out the oxides.

4. A process of treating water for supply systems which consists in contacting the water with a bed of finely divided catalyzer material containing manganese dioxide to change the soluble salts of manganese in the water to manganese hydroxides and oxides, producing alkalinity in the water, thereafter causing the water to flow in a manner to expose a large surface thereof to air for oxygenating it, and collecting and filtering out said hydroxides and oxides.

5. A process of treating water for supply systems which consists in contacting the water with a catalyzer bed of pyrolusite to change the soluble salts of manganese therein to manganese hydroxides and oxides, producing alkalinity in the water, thereafter causing the water to flow in a manner to expose a large surface thereof to air for oxygenating it, and collecting and filtering out the hydroxides and oxides.

6. A process of treating water for supply systems which consists in changing the soluble salts of manganese therein to manganese hydroxides and oxides, thereafter causing the water to flow in a manner to expose a large surface thereof to air for oxygenating it, and collecting and filtering out the hydroxides and oxides.

7. A process of treating water for supply systems which consists in contacting the water with a bed of finely divided catalyzer material containing manganese dioxide for a sufficient length of time to change the soluble salts of manganese in the water to manganese hydroxides and oxides, thereafter causing the water to flow in a thin and agitated sheet exposed to air for oxygenating it, then contacting it with a bed of finely divided porous material, itself inert and basic in character, for a sufficient length of time to effect fixation and deposition of the manganese in insoluble hydroxides and oxides thereof, then passing the water through a filter bed to the system.

8. A process of treating water for supply systems which consists in contacting the water with a bed of finely divided pyrolusite for a sufficient length of time to change the soluble salts of manganese in the water to manganese hydroxides and oxides, thereafter causing the water to flow in a thin and agitated sheet exposed to air for oxygenating it, then contacting it with a bed of finely divided coke for a sufficient length of time to effect fixation and deposition of the manganese as insoluble hydroxides and oxides thereof, then passing the water through a filter bed to the system.

9. A process of treating water for supply systems which consists in contacting the water with a bed of finely divided pyrolusite for not less than ten minutes, thereafter causing the water to flow in a thin agitated sheet exposed to air for oxygenating it, then contacting it with a bed of finely divided coke for not less than ten minutes and then passing the water through a filter bed to the system.

CARL ZAPFFE.